United States Patent [19]

Konishi

[11] Patent Number: 4,716,285

[45] Date of Patent: Dec. 29, 1987

[54] LIGHT AMOUNT CORRECTION METHOD AND APPARATUS FOR IMAGE OUTPUT SYSTEM

[75] Inventor: Masahiro Konishi, Kaisei, Japan

[73] Assignee: Fuji Photo Film Co., Ltd., Minami-Ashigara, Japan

[21] Appl. No.: 767,911

[22] Filed: Aug. 21, 1985

[30] Foreign Application Priority Data

Aug. 23, 1984 [JP] Japan .............................. 59-175763
Sep. 5, 1984 [JP] Japan .............................. 59-185897

[51] Int. Cl.$^4$ ............................................. G01J 1/32
[52] U.S. Cl. ................................... 250/205; 250/226
[58] Field of Search ...................... 250/205, 226, 214; 356/404; 358/293, 294

[56] References Cited

U.S. PATENT DOCUMENTS

| | | | |
|---|---|---|---|
| 4,048,493 | 9/1977 | Lee | 250/226 |
| 4,117,375 | 9/1978 | Bachur et al. | 250/205 |
| 4,281,245 | 7/1981 | Brogardh et al. | 250/205 |
| 4,375,067 | 2/1983 | Kitamura | 250/205 |
| 4,588,883 | 5/1986 | Abbas | 250/205 |

*Primary Examiner*—David C. Nelms

*Attorney, Agent, or Firm*—Wenderoth, Lind & Ponack

[57] ABSTRACT

A light amount correction apparatus for an image recording system in which a photographic material is exposed with light from semiconductor light sources of three colors to record images includes a driving circuit which controls the semiconductor light sources electrically with image signals so as to emit light. A monitor circuit is provided to sequentially measure the amount of light emitted from the semiconductor light sources with a photosensor and respectively outputs voltage signals corresponding thereto. Setting circuits are also provided for respectively setting reference signals for the three colors and a correction circuit is provided for adding deviations to the image signals, the deviations being obtained by respectively comparing voltage signals from the monitor circuit with the reference signals. A filter is disposed between the semiconductor light sources and the photosensor for equalizing a spectral sensitive characteristic of the photosensor with a spectral sensitive characteristic of the photographic material such that each exposure amount of light from the semiconductor light sources pass through the filter so as to always expose the photographic material with light having a constant amount and temperature.

10 Claims, 14 Drawing Figures

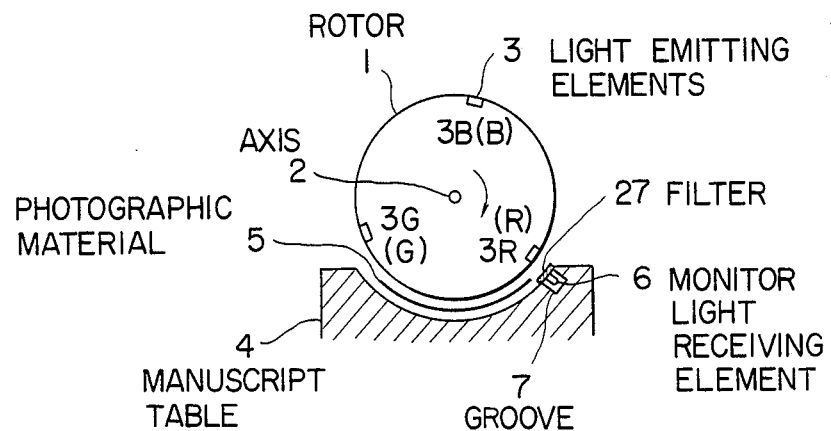
FIG. IA
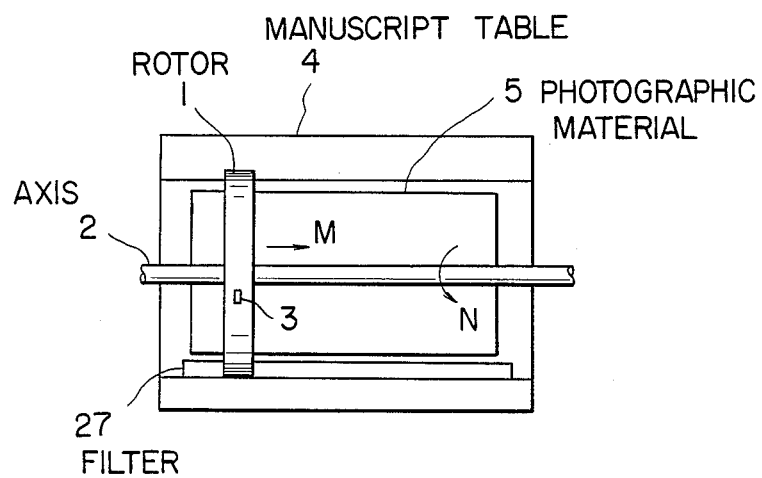
FIG. IB

EXPOSURE AMOUNT EXM $\lambda_1$ WAVELENGTH

TRANSMISSION CHARACTERISTIC TP $\lambda_1$ WAVELENGTH

SPECTRAL SENSITIVITY CHARACTERISTIC M $M(\lambda)$ $\lambda$ WAVELENGTH

TRANSMISSION CHARACTERISTIC H $H(\lambda)$ $\lambda$ WAVELENGTH

LIGHT EMITTING ELEMENT 3   FILTER 30   5 PHOTOGRAPHIC MATERIAL

LIGHT AMOUNT CORRECTION METHOD AND APPARATUS FOR IMAGE OUTPUT SYSTEM

BACKGROUND OF THE INVENTION

This invention relates to a light amount correction method and the apparatus therefor which corrects for variations in the light amount caused by thermal or structual changes in a semiconductor light source which is used in an image output system.

A semiconductor light source such as a light emitting diode is widely used as the light source for image output systems which expose photographic films and output images because semiconductor light sources are advantageous in durability and cost. Semiconductor light sources, however, suffer defects in that thermal conditions significantly influence emission efficiency as well as spectral characteristics. There have been proposed various methods for correcting for such fluctuations. The most widely used method comprises the steps of detecting the temperature of a light source and compensating for the change, but the measurement of the temperature in the light source per se presents considerable difficulties, which often makes accurate correction almost impossible. It is also difficult to correct changes in light amount caused by chronological changes in the light source or to compensate for the changes in light amount occurring as the light advances from the semiconductor chip to the photographic material. The demand for an apparatus which can correct for all of those fluctuations is therefore keenly felt.

The semiconductor light source is also defective in that the amount of exposure widely fluctuates because of the synergistic effect with the spectral sensitivity of a photographic material such as photographic films. Various corrective methods have been contrived to compensate for such thermal fluctuations. For example, the temperature of a semiconductor light source is kept constant by means of a heater according to one of the prior art methods. Such a method is, however, not desirable because it does not take into account the characteristics of the photographic material at all, and the life of the light source is unavoidably reduced as it is constantly used at a high temperature, and additional energy is needed for controlling the temperature.

SUMMARY OF THE INVENTION

It is an object of this invention to provide a light amount correction apparatus in an image output system which can constantly correct and compensate for thermal variations by providing a light receiving element which monitors the amount of light from the source so that if the output from the light receiving element deviates from a prescribed reference value, the deviation is corrected by adjusting the electric current input to the semiconductor light source.

Another object of this invention is to provide an exposure correction method for semiconductor light source which allows constant exposure under the same conditions irrespective of the ambient temperature.

According to this invention in one aspect thereof, for achieving the objects described above, there is provided a light amount correction apparatus for image output systems wherein a photographic material is exposed with light from a semiconductor light source to output images, which is characterized by the structure comprising a driving circuit which controls said semiconductor light source electrically with image signals, a monitor circuit which measures the amount of light from said semiconductor light source by a light receiving element and converts the measured amount of light into voltage signals, a correction circuit which adds the deviation obtained by comparing the voltage signal from the monitoring circuit with a reference signal to the image signals, and a filter inserted between said semiconductor light source and said light receiving element to thereby make said semiconductor light source emit light with a constant amount and temperature as well as to expose said photographic material with such a constant light source.

According to this invention in another aspect thereof, for achieving objects described above, there is provided an exposure correction method for a semiconductor light source which is characterized in that a filter having a transmission characteristic to keep an exposure constant by the correction of the spectral characteristics of said semiconductor light source and of said photographic material is provided between the semiconductor light sources and the material so that said material is exposed with the light from said semiconductor light source via the filter.

The nature, principle and utility of the invention will become more apparent from the following detail description when read in conjunction with the accompanying drawings.

BRIEF DESCRIPTION OF THE DRAWINGS

In the accompanying drawings:

FIG. 1A is a side structural view to show an embodiment of the image output apparatus according to this invention;

FIG. 1B is a plane view thereof;

DESCRIPTION OF THE PREFERRED EMBODIMENTS

Figure 2:
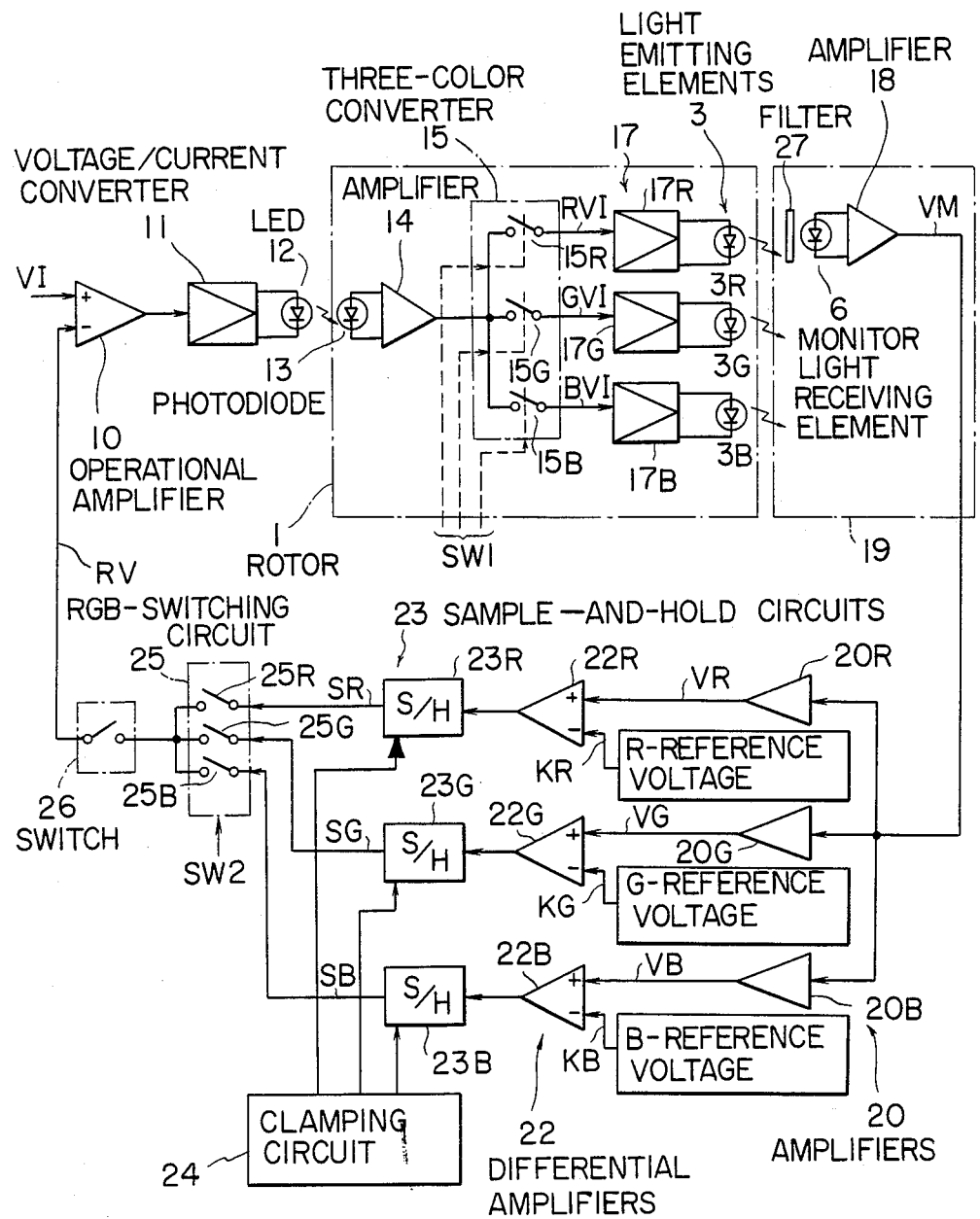
FIG. 2 is a circuit diagram of an embodiment of this invention.

An embodiment of the image output apparatus according to this invention is illustrated in FIGS. 1A and 1B wherein a disk-type rotor 1 is made rotatable around an axis 2 in the direction N, three light emitting elements 3 (3R, 3G and 3B) such as light emitting diodes are arranged at equally angular intervals on the circumference to emit three primary colors of R (red), G (green) and B (blue) at a predetermined cycle. The above elements 3 compose a recording head. A manuscript table 4 is provided beneath the rotor 1 to mount a photographic material 5 on the image output section thereof. As the rotor 1 is operatively rotated (for main scanning), the photographic material 5 is exposed with the light from the light emitting elements 3, and the light emitting elements 3 output image scanning lines onto the photographic material 5 in the main scanning direction. The rotor 1 is moved in the direction M for auxiliary scanning of the photographic material 5. The above main and auxiliary scannings record color images over the whole surface of the material 5. A monitor light receiving element 6 is positioned so as to receive the light from the three light emitting elements 3 via a filter 27 (which will be described hereinafter) and is moved within a groove 7 in the direction M so as to maintain the same positional relationship with the rotor 1 for auxiliary scanning.

FIG. 2 shows the control system of the light emitting elements 3 in an image output apparatus wherein an image signal VI which is transmitted from the image processing system is inputted to an operational amplifier 10. The output signal from the operational amplifier 10 is inputted to a voltage/current converter 11, and the output signal is applied to a light emitting diode (LED) 12 and a photodiode 13 which from a non-contact signal transmission means. With such construction, a signal corresponding to the image signal VI is transmitted to the rotating rotor 1 by means of photo-spatial transmission. The signal from the photodiode 13 is inputted to a three-color converter 15 for each of the R, G and B colors via an amplifier 14. The three-color converter 15 comprises three switches (for example, analog switches) 15R, 15G and 15B which are respectively turned on/off with switching signals SW1 from a control system (not shown). The three color image signals RV1, GV1 and BV1 from the switches 15R, 15G and 15B are respectively fed to the light emitting elements 3 (3R, 3G and 3B) via respective amplifiers 17 (17R, 17G and 17B) to make the light emitting elements 3R, 3G and 3B emit light separately. The light R, G, and B, emitted from the light emitting elements 3 expose the photographic material 5 and are inputted to the monitor light receiving element 6 which is arranged to oppose the light emitting elements 3 in a non-contacting manner via a filter 27 which will be described in detail hereinafter. The output signal from the monitor light receiving element 6 is amplified by an amplifier 18 and inputted as an image signal VM in respective colors R, G and B to amplifiers 20 (20R, 20G and 20B). The output signals VR, VG and VB from the amplifiers 20R, 20G and 20B are respectively inputted to differential amplifiers 22 (22R, 22G and 22B) to compute respective deviations from the reference voltages KR, KG and KB, and clamped timewise by a clamping circuit 24 and sample-and-hold circuits 23 (23R, 23G and 23B).

After being clamped and held, the three color sample signals SR, SG and SB are switched for each other by an RGB-switching circuit 25, and inputted to the operational amplifier 10 via a switch 26 to form an operation loop for addition or subtraction. The RGB-switching circuit 25 comprises three switches 25R, 25G and 25B which are sequentially turned on/off with a switching signal SW2 from the control system. The switching signals SW1 and SW2 have a corresponding relationship to each other.

Figure 3:
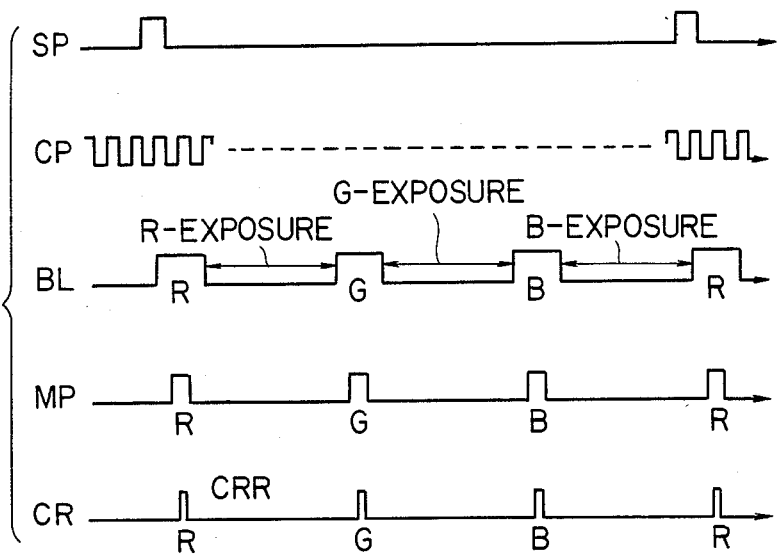
FIG. 3 is a timing chart used to explain the operation thereof.

In FIG. 1A, one of the light emitting element 3R is about to reach a position corresponding to the monitor light receiving element 6, which indicates a state immediately before the beginning of the main scanning. When a start pulse SP of FIG. 3 is inputted to an image processing circuit (not shown), a blanking pulse BL is inputted to the image processing circuit to turn off the switch 26. Clock pulses CP are utilized to synchronize various component elements. During the time interval that a monitor pulse MP is outputted, the image signal VI functions as the reference signal and the light emitting elements 3 emit light in an amount corresponding to the reference signal. The emitted light is received at the monitor light receiving element 6 via the filter 27 to output the image signal VM. The three color converter 15 is kept ON with the switching signals SW1 at the switch 15R, if it is the color red, from the time when the element 3R reaches the monitor light receiving element 6 until the time when the next element 3B comes to meet the monitor element 6. When the monitor light receiving element 6 starts receiving light due to the reference signal VI, the output signal VM therefrom is amplified by the amplifiers 20 (20R, 20G and 20B), and the output signal VR from the amplifier 20R of the R channel is compared with the reference voltage KR which has been previously set in the differential amplifier 22R. If the amount L of light emitted from the element varies by $\Delta L$ from the reference value $L_0$ due to a change in temperature, the output signal from the monitor light receiving element 6 varies responsive to the variation $\Delta Q$. Since the reference voltage KR at the differential amplifier 22R is set at a value corresponding to the reference light emission $L_0$, the output therefrom becomes the voltage corresponding to the amount L, and this voltage is inputted to the sample-and-hold circuit 23R.

The clamping circuit 24 acts corresponding to the clamping pulses CR of FIG. 3, and if it is assumed that a clamping pulse CRR of R is generated, the voltage which has been clamped is reset with the rise of this new pulse CRR and the voltage which has been inputted to the sampled-and-hold circuit 23R is clamped with the fall of the pulse CRR. Since the switch 26 is being kept OFF, the preparation is completed for the voltage corresponding to the variation in the amount of light emitted from the element 3R to be fed to the operational amplifier 10. As the rotor 1 further rotates to the point to start exposure or until the blanking pulse BL of FIG. 3 comes to indicate an R-exposure, the switch 26 is turned ON and the image signal VI becomes a normal signal for image output. Since the normal image signal VI is constantly added to the voltage for controlling the amount of light emission by the operational amplifier 10, the photographic material 5 is always exposed with the corrected amount of light. The description has been given above with respect to the R channel where the switches 15R and 25R are turned ON with switching signals SW1 and SW2, but similar operations are performed in the G and B channels.

Figure 4:
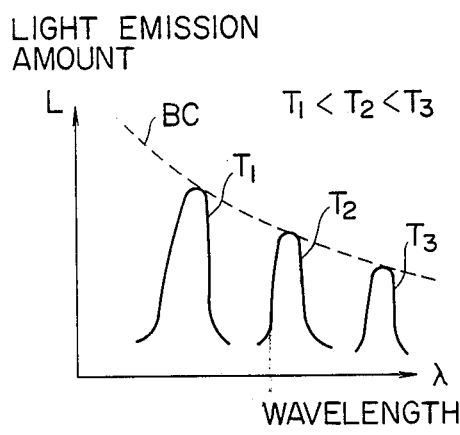
FIG. 4 is a graph used to show the spectral characteristics of a light emitting diode.

If the current passing through the light emitting diode is assumed to be constant, the diode has the spectral characteristics that the light emission amount L and the wavelength λ of the emitted light vary corresponding to the changes in temperature T as shown in FIG. 4. Peak points of the spectral characteristic with respect to ambient temperature are plotted in the graph to form the dotted line curve BC which indicates the temperature spectral characteristic of the light emitting diode.

Figure 5:
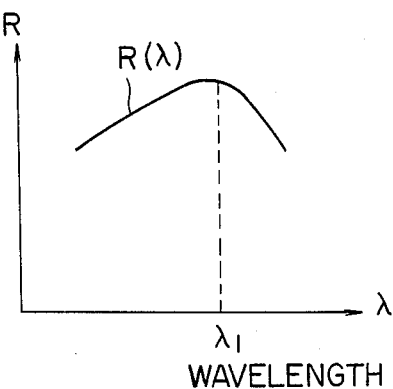
FIG. 5 is a graph to show the spectral sensitivity of a photographic material.

The amount L of light emitted from the light emitting diode 3 should therefore be controlled to give constant exposure on the photographic material 5 with the spectral sensitivity characteristic R(λ) taken into consideration as shown in FIG. 5. According to this invention, by means of the filter 27, the spectral sensitive characteristic of the light monitored by the monitor light receiving element 6 is equalized with the spectral sensitivity characteristic of the photographic material 5. How to set the spectral characteristic of the filter 27 will be described in detail below.

Figure 6:
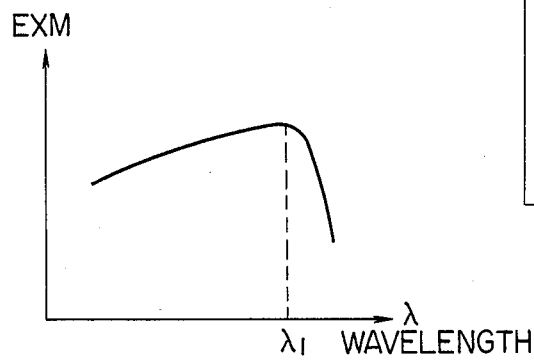
FIG. 6 is a graph showing the exposure characteristics thereof.
Figure 7:
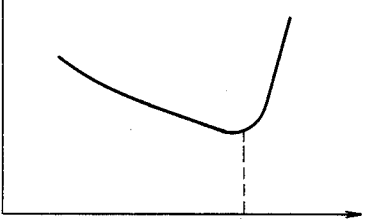
FIG. 7 is a graph showing the transmission curve of a filter.

The spectral sensitivity characteristic R(λ) of the photographic material 5 which expresses relative sensitivity against the wavelength λ of an exposure light source generally assumes the curve shown in FIG. 5 while the amount L of light emitted from the light emitting diode shows the characteristics shown in FIG. 4 when the value of the current passing therethrough is constant. FIG. 6 shows the exposure amount EXM of the photographic material 5 in terms of the exposure characteristic with respect to the wavelength λ according to the spectral sensitivity characteristic of the photographic material 5 and the temperature spectral characteristic of the light emitting diodes 3. If a filter, as shown in FIG. 7, having a transmission characteristic TP which is opposite to the exposure characteristic EXM in FIG. 6 is inserted between the light emitting diodes 3 and the photographic material 5, the temperature change characteristic as shown in FIG. 6 will be offset and compensated for by the two opposite characteristics. More particularly, since the light emitting diodes 3 have the spectral characteristic of FIG. 4 so as to emit light within a narrow range of wavelength λ, if it is assumed that the light amount required for exposure is satisfied by a peak value in the range, the temperature spectral characteristic curve formed by plotting peak values and the exposure amount with the spectral sensitivity characteristic R(λ) shown in FIG. 5 assume the exposure characteristic EXM as shown in FIG. 6. If the spectral characteristics L(λ) of the light emitting diodes 3 and the spectral sensitivity characteristic R(λ) of the photographic material 5 are determined, the exposure amount EXM can be obtained by converting the change in the ambient temperature T to the change in wavelength λ. In this case the exposure amount EXM can be expressed below as:

$$Q = \int_{\lambda_{min}}^{\lambda_{max}} R(\lambda) \cdot L(\lambda) d\lambda \tag{1}$$

If the light transmission characteristic of a filter is H(λ), the exposure amount Q' is expressed below as:

$$Q' = \int_{\lambda_{min}}^{\lambda_{max}} R(\lambda) \cdot L(\lambda) \cdot H(\lambda) d\lambda \tag{2}$$

Figure 10:
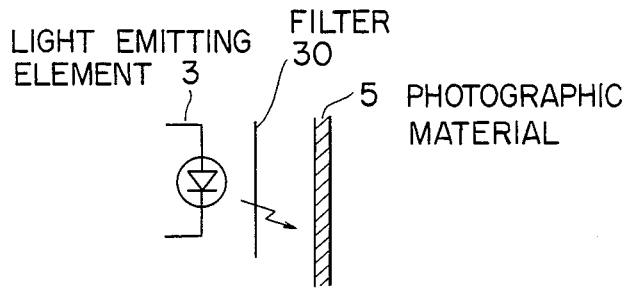
FIG. 10 is a schematic view used to show the state of exposure according to this invention.

Therefore, by selecting and determining the light transmission characteristic H(λ) such that Q'=constant, the exposure amount EXM is constant and independent of the temperature T. As shown in FIG. 10, if the filter 30 having the light transmission characteristic H(λ) which can compensate for the exposure characteristics of the light emitting diodes 3 and of the photographic material 5 is inserted between the element 3 and the photographic material 5 so that the light exposes the photographic material 5 through the filter 30, the exposure of the photographic material 5 is not influenced by the changes in ambient temperature T.

This invention also takes into account the characteristic of the monitor light receiving element 6. If the relative sensitivity of the photographic material 5 is expressed as R(λ) (FIG. 5) and the amount of light emitted from the light emitting diodes 3 as L(λ), the exposure amount Q can be expressed below as:

$$Q = \int_{\lambda_{min}}^{\lambda_{max}} R(\lambda) \cdot L(\lambda) d\lambda \tag{3}$$

Figure 8:
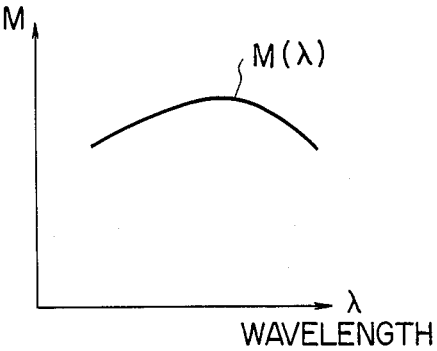
FIG. 8 is a graph showing the spectral sensitivity characteristic of a monitor light receiving element.

The monitored amount P by the light receiving element 6 can be expressed as shown below if the spectral sensitivity characteristic thereof is represented as M(λ) (FIG. 8), and the transmission characteristic of the filter 27 as H'(λ).

$$P = \int_{\lambda_{min}}^{\lambda_{max}} M(\lambda) \cdot H'(\lambda) \cdot L(\lambda) d\lambda \tag{4}$$

If the exposure amount Q is to be controlled with the monitored amount P of the light receiving element 6 (in other words, if the amount of light emitted from the light emitting diodes 3 is to be controlled), the monitored amount P must be proportional to the exposure amount Q. Therefore, the relationship shown below holds.

$$M(\lambda) \cdot H'(\lambda) = R(\lambda) \tag{5}$$

Figure 9:
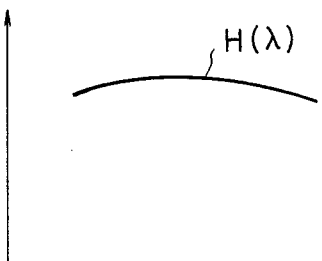
FIG. 9 is a graph showing the transmission curve of a filter used in this invention.

The light transmission characteristic H'(λ) of the filter 27 must be set to satisfy the following equation (FIG. 9).

$$H'(\lambda) = \frac{R(\lambda)}{M(\lambda)} \tag{6}$$

As described in the foregoing, simply by positioning the filter 27 having the light transmission characteristic H'(λ) in front of the monitor light receiving element 6, the amount of light emitted from the light emitting diodes 3 can be controlled to provide a constant exposure of the photographic material 5 irrespective of the wavelength fluctuations of the light emitting diodes 3.

In the above embodiment, since the monitor light receiving element 6 is positioned at the same level as the photographic material 5 for monitoring, it is possible to correct not only thermal fluctuations but also fluctuation of all types in the amount of light from the semiconductor chip of the light emitting diode to the photographic material 5; e.g. a chronological or thermal changes, eccentricity of the rotor 1, etc. Since the correction in temperature is all set for fixed elements from the output voltage of the monitor light receiving element 6 to the amplifier 10, correction thereof is performed simply means of an ordinary temperature correction means. Since the monitor light receiving element 6 uses almost no electric current, it does not generate heat nor causes a change in temperature.

Figure 11:
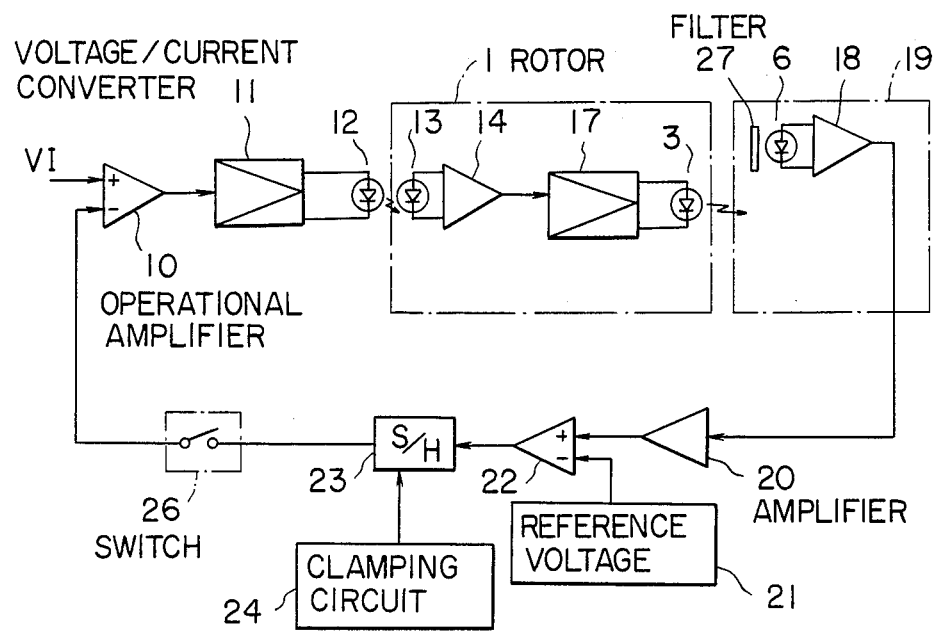
FIG. 11 is a circuit diagram of another embodiment of this invention.

Although a photo-coupler is used as a non-contact converting means in the foregoing description, other means such as electro-magnetic means may be used. Further-more, the light amount correction apparatus is described above to output color images by using three color light emitting diodes of R, G and B, but if the light amount is to be corrected for one color alone, the structure shown in FIG. 11 may be used in place of that shown in FIG. 2. In the structure in FIG. 11, the switches 15 and 25 for colors are deleted and only one group of amplifiers is used to achieve the similar correction in light amount.

Figure 12:
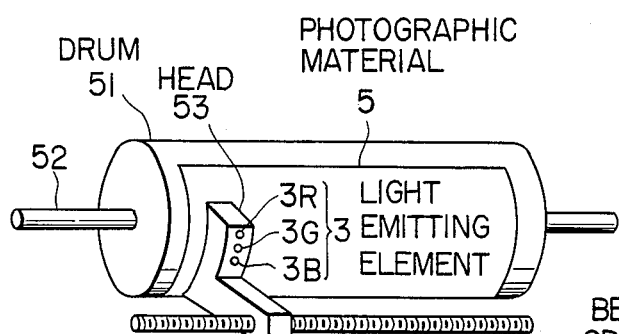
FIGS. 12 and 13 are views showing other image output apparatus to be used in this invention, respectively.
Figure 13:
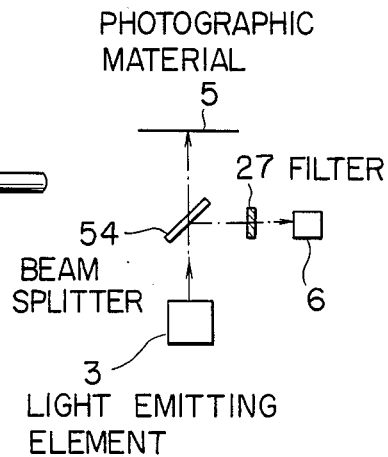

The explanation is given in the above in relation to the case where this invention apparatus is applied to an image output system which exposes a photographic material 5 with light from the light source on a rotating rotor 1. This invention apparatus, however, may be applied to another image output system as shown in FIG. 12 where a photographic material 5 is wound around a drum 51, and three light emitting elements 3R, 3G and 3B are provided on a head 53 opposing to a drum 51 to perform scanning and exposing by rotating the drum 51 around an axis 52 and moving the head 53 in the direction toward the rotating axis 52 of the drum 51. As shown in FIG. 13, in this case, the light from the light emitting element 3 is split with a beam splitter 54, monitored with respect to the amount with a monitor light receiving element 6 via the aforementioned filter 27 and the element 3 is controlled.

As is described in the foregoing, this invention enables one to correct for not only fluctuations in electrical characteristics of a semiconductor light source but all the other types of variations due to changes in an optical system which cannot be detected electrically and structural changes to fluctuations thermally caused on the light source and photographic materials to thereby realize an image output system which is capable of outputting higher quality images. Moreover, this invention can offer prescribed exposure conditions which are not influenced at all by changes in environment without requiring any special means for keeping the temperature of the light source constant. This invention can enable a stable exposure with an inexpensive and simple structure and is applicable to any semiconductor light source having various spectral characteristics simply by changing filters, thus significantly widening the scope of application.

It should be understood that many modifications and adaptations of the invention will become apparent to those skilled in the art and it is intended to encompass such obvious modifications and changes in the scope of the claims appended hereto.

What is claimed is:

1. A light amount correction apparatus for an image recording system wherein a photographic material is exposed with light from semiconductor light sources of three colors to record images, which comprises:
   a driving circuit which controls said semiconductor light sources electrically with image signals so as to emit light;
   a monitor circuit which sequentially measures the amount of light emitted from said semiconductor light sources with a photosensor and respectively outputs voltage signals corresponding thereto;
   setting circuits for respectively setting reference signals for the three colors;
   a correction circuit which adds deviations to said image signals, said deviations being obtained by respectively comparing voltage signals from said monitor circuit with said reference signals; and
   a filter disposed between said semiconductor light sources and said photosensor for equalizing a spectral sensitive characteristic of said photosensor with a spectral sensitive characteristic of said photographic material;
   wherein each exposure amount of light from said semiconductor light sources pass through said filter so as to always expose said photographic material with light having a constant amount and temperature.

2. A light amount correction apparatus as claimed in claim 1, wherein said semiconductor light sources comprise three colors of red, green and blue each of which can be separately and independently controlled.

3. A light amount correction apparatus as claimed in claim 1, wherein said semiconductor light sources are light emitting diodes.

4. A light amount correction apparatus as claimed in claim 1, wherein said correction circuit comprises three comparators which compare signals from said monitor circuit with said reference voltages and three sample-and-hold circuits which respectively hold outputs from said comparators.

5. A light amount correction apparatus as claimed in claim 4, wherein said correction circuit further includes a switch circuit which switches output signals from said sample-and-hold circuits for the three colors.

6. A light amount correction apparatus as claimed in claim 1, wherein said photosensor is moved in an interlocking manner with movement of said semiconductor light sources.

7. A light amount correction apparatus as claimed in claim 1, wherein a light transmission characteristic $H(\lambda)$ of said filter is expressed as:

$$H(\lambda) = R(\lambda)/M(\lambda)$$

wherein
   $\lambda$: wavelength,
   $R(\lambda)$: relative sensitivity of said photographic material,
   $M(\lambda)$: spectral sensitivity characteristic of said photosensor.

8. An exposure correction apparatus for an image recording system wherein a photographic material is exposed with light from a semiconductor light source to record images and wherein a filter is disposed between said semiconductor light source and said photographic material, and said filter has a light transmission characteristic arranged so as to keep an exposure amount constant by correcting spectral characteristics of said semiconductor light source and said photographic material so as to expose said photographic material with light from said semiconductor light source via said filter.

9. An exposure correction apparatus as claimed in claim 8, wherein said semiconductor light source is a light emitting diode.

10. An exposure correction apparatus as claimed in claim 8, wherein said transmission characteristic of said filter is opposite to an exposure amount characteristic of said photographic material.

* * * * *